United States Patent

Jokinen et al.

[11] Patent Number: 5,911,397
[45] Date of Patent: Jun. 15, 1999

[54] WORK PAD FOR SUPPORTING AN INPUT DEVICE OF A COMPUTER

[75] Inventors: Tapani Jokinen, Turku; Hanna Vuolteenaho, Oulu, both of Finland

[73] Assignee: Top-Cousins Oy, Helsinki, Finland

[21] Appl. No.: 08/702,561

[22] PCT Filed: Feb. 5, 1996

[86] PCT No.: PCT/FI96/00067

§ 371 Date: Sep. 11, 1996

§ 102(e) Date: Sep. 11, 1996

[87] PCT Pub. No.: WO96/25069

PCT Pub. Date: Aug. 22, 1996

[51] Int. Cl.[6] .................................................. A47B 91/00
[52] U.S. Cl. ................. 248/346.01; 108/43; 248/118.1; 248/918
[58] Field of Search ............... 248/346.01, 928, 248/118; 108/43

[56] References Cited

U.S. PATENT DOCUMENTS

| | | | |
|---|---|---|---|
| 5,355,811 | 10/1994 | Brewer | 108/43 |
| 5,467,952 | 11/1995 | Martin | 248/918 X |
| 5,593,128 | 1/1997 | Odom et al. | 248/918 X |
| 5,678,800 | 10/1997 | Markussen | 248/346.01 |
| 5,686,005 | 11/1997 | Wright, Sr. | 248/918 X |

FOREIGN PATENT DOCUMENTS

| | | |
|---|---|---|
| 0 723 500B1 | 7/1996 | European Pat. Off. . |
| 92796 | 9/1994 | Finland . |

*Primary Examiner*—Ramon O. Ramirez
*Attorney, Agent, or Firm*—Nikaido, Marmelstein, Murray & Oram LLP

[57] ABSTRACT

A work pad for supporting an input device of a computer comprises a flat upper working surface for supporting a computer input device, said flat upper working surface being completely planar, and a flat bottom surface on a reverse side of the working surface. Protrusions are provided on the bottom surface, with the protrusions being permanently attached to the bottom surface for supporting the work pad on a supporting surface.

14 Claims, 3 Drawing Sheets

WORK PAD FOR SUPPORTING AN INPUT DEVICE OF A COMPUTER

TECHNICAL FIELD

This invention concerns a pad, and more specifically a kind of pad that enables flexible work with, for example, a mouse, which is used quite widely at present in computer work.

BACKGROUND OF THE INVENTION

Several kinds of mouse pad are know. Each type has its own advantages and disadvantages and each has tried to solve various problems, most of which are connected in one way or another with work ergonomics. Work at a computer terminal with a mouse can cause quite a lot of different stress injuries, including tendovaginitis and various muscle problems in the neck and shoulder areas.

Various solutions to improve work ergonomics and free working space have been offered. In many solutions, a wrist support is used to improve the working position of the wrist, thereby avoiding injuries to the wrist area. Other pads are known which provide an opportunity to move the working platform out of the way under the table, for example, when it is not being used. Other solutions are known in which the mobility of the wrist support has been improved. Yet another solution, Finnish patent 92796, exists for a mouse pad. This solution originates from the premise that the mouse pad rests on the user's thigh. For this purpose, the mouse pad has a concave side, which is positioned on the thigh.

The solution described above is awkward and massive. If the above mentioned concave side is placed on the thigh, it creates a tight fit which leads to sweating. The concave form fits some thighs well, while for others it is too loose or too tight. As the pad mentioned is appropriate for use only on the thigh, it is not adaptable. Based on the diagram presented, the amount of materials needed in its manufacture is not appropriate for large-scale production. Far too much material must be used in realizing the idea presented.

SUMMARY OF THE INVENTION

The purpose of this invention is to improve the solutions mentioned above and produce a kind of pad, in particular a mouse pad, which enables a very natural hand position on the thigh while using the mouse. A further purpose is to produce a pad, in particular a mouse pad, with which it is possible to move operation to the table if so desired, as the characteristics of a pad according to the invention suit table work as well. A further purpose is to ensure that, when situated on the thigh, a pad according to the invention is easily adaptable to any shape of thigh whatever, and that in particular it does not cause sweating while on the thigh, but allows good ventilation and a pleasant feeling. An additional purpose is produce a pad particularly appropriate for use with portable microcomputers, which enables the use of a separate mouse, instead of an integrated mouse of quite poor quality.

The above-mentioned and other purposes and advantages are produced by a solution, whose characteristic features are given in the attached patent claims.

BRIEF DESCRIPTION OF THE DRAWINGS

The invention is described in greater detail in the following, with reference to the attached diagrams, which present one well-regarded embodiment of the invention. Thus

DETAILED DESCRIPTION OF THE INVENTION

Figure 1:
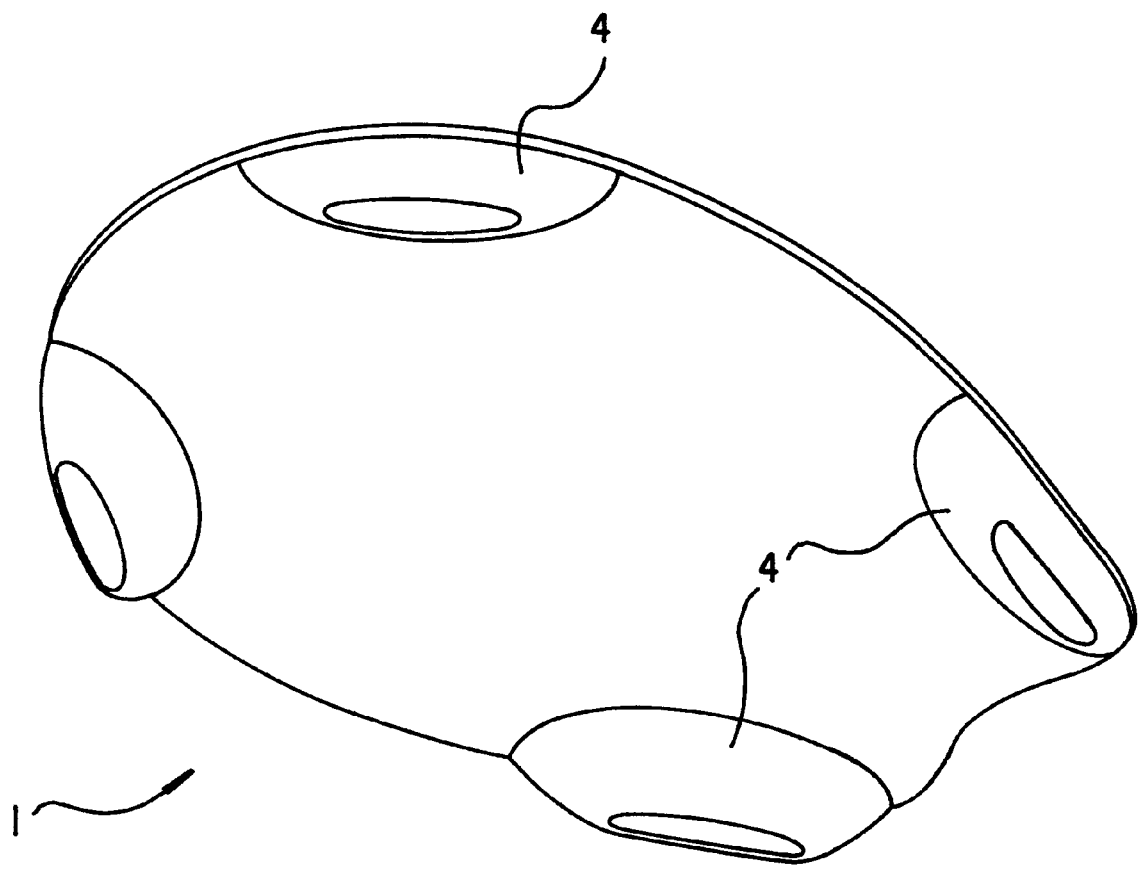
FIG. 1 presents one embodiment of the invention in an axonometric diagram.
Figure 2:
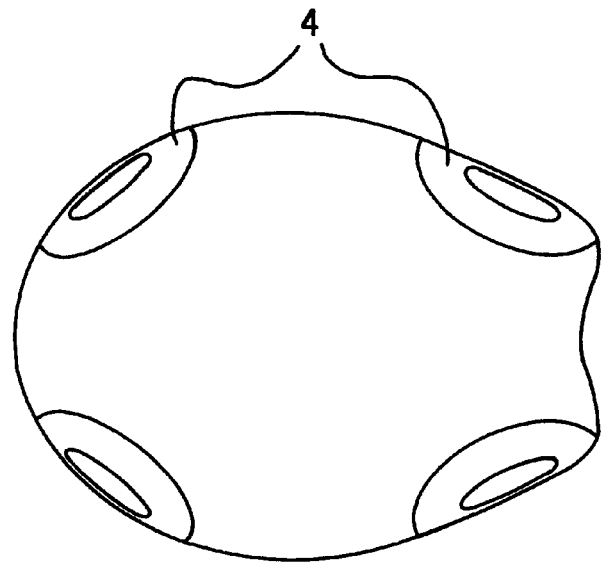
FIG. 2 presents the pad of FIG. 1 as seen directly from underneath.
Figure 4:
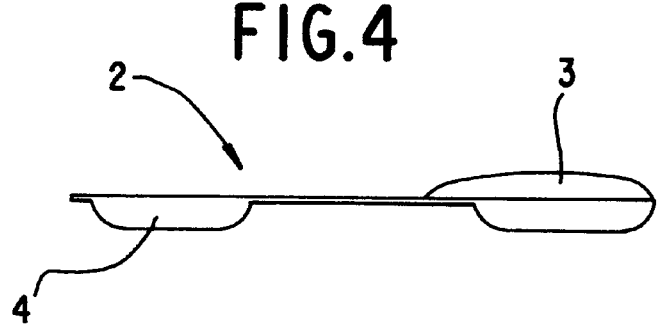
FIG. 4 presents a side view of a pad according to the invention.
Figure 3:
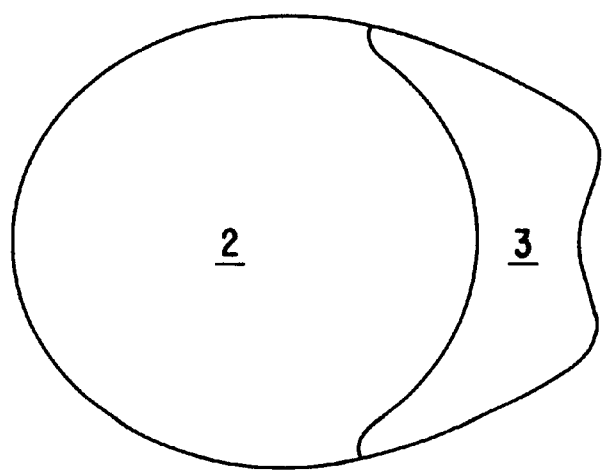
FIG. 3 presents a pad according to the invention as seen from above.

FIGS. 1–4 therefore present a pad according to the invention, and mouse pad 1 in particular, as seen from different perspectives; obliquely from underneath in FIG. 1, directly from underneath in FIG. 2, from above in FIG. 3 and from the side in FIG. 4.

Pad 1 is formed in the usual way from an essentially smooth, even surface 2, upon which the mouse is intended to move in order to operate the computer. The wrist support, which can be of any shape whatever, is marked schematically with the reference number 3.

The basic concept of the invention is that pad 1 is shaped in such a way that it can be placed on the user's thigh, and can be easily changed back to a regular table mouse pad, when needed, by simply moving the pad to a suitable table surface.

The under surface of mouse pad 1 according to the invention is basically even. In the embodiment present, however, the under surface is equipped with four protrusions 4, located so that the pad is supported on the thigh by two protrusions 4 on one side of the thigh and two protrusions 4 on the other side of the thigh. In this way, the pad stays in place and enables the easy, yet functional, use of the mouse with the hand, which is in a very relaxed position resting on the thigh.

The positioning and form of the protrusions 4 is such that they support the thigh pleasantly from the sides. Should the thigh be narrow, pad 1 presses "deeper" on the thigh, while with wider thighs, the protrusions 4 are supported by the outer sides of the thigh in a higher position. In this way, a pad according to the invention achieves an exceptionally good fit, regardless of the form of the thigh upon which it lies. A pad according to the invention does not form a seal on the thigh, for which reason the pad does not cause sweating.

The steady working position of a pad 1 according to the invention on the table or other surface is also ensured with the protrusions 4. In the embodiment presented, the four protrusions form four support points on the surface. Because these support points are located quite far from each other on the rim of the pad, sturdy placement on tables or other similar surfaces is always successful.

Figure 5:
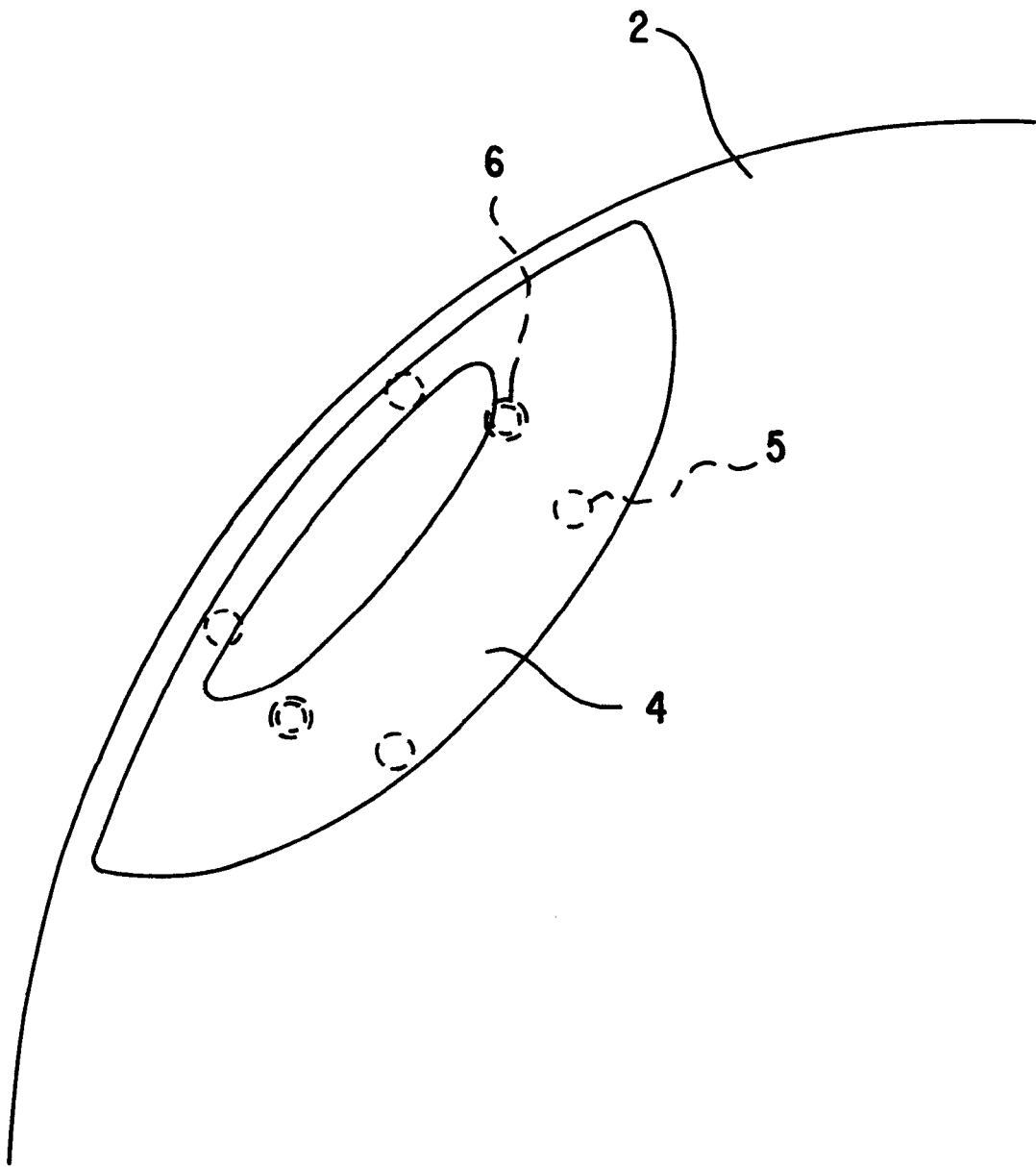
FIG. 5 presents an embodiment of the invention, in which it is possible the adjust the positions of the protrusions on the under surface of the base.

FIG. 5 shows, to a larger scale, one exemplary embodiment of a part of the invention, which only differs from the above in that the protrusions 4 can be set to different positions. It is not, however, intended that the positions are altered every time before use, but rather that the user finds a suitable position, which he will probably be content to use later as well.

There are many alternative ways of attaching the protrusions to the under surface base plate itself. One of these is a permanent attachment using adhesive surfaces. In that case, the plate 2 and the protrusions 4 are supplied as separate components and particularly in such a way that the protrusions 4 are equipped with adhesive surfaces protected by removable paper covers or similar. The user finds a suitable position and attaches the protrusions with the aid of the exposed adhesive surfaces.

A second alternative is to use, for example, a so-called "Velcro" attachment, by means of which a separable attachment is created, giving the possibility of later adjusting the positions of the protrusions by simply tearing the joints apart and re-attaching them in a new position.

A third alternative could be a pin/hole connection of the kind shown in FIG. 5. In this case, there are several holes in the under surface of plate 2, either grouped together, or as shown in FIG. 5, in two rows. The bold ring 6 symbolizes the pin component, which, in the form shown, retains protrusion 4 in the central position. However, one or other, or both pin components can, if desired, be moved to other holes and thus provide a great deal of variety in the possible adjustments of each protrusion. It is obvious that the pin/hole system can be made in any form at all, even in one that permits not only rotational adjustment, but also movement in different directions.

The pad according to the invention is manufactured from suitable material, such as cellular plastic, with an appropriate manufacturing method. Naturally, other materials can be utilized, particularly plastics in various forms. One suitable plastic material is polyurethane, for example. If the pad requires even more stability, reinforcements can be added to the material, or appropriate reinforcement projections can be added to the pad at its edges, for example. The upper surface of a pad according to the invention can also been covered with a covering material if needed, which allows the ball of the mouse to move around the intended area smoothly, while the wrist support area can be covered to provide a pleasing surface for the wrist, and, if needed, the under surface of the pad can be coated with a material that would prevent sliding and/or sweating.

It should also be mentioned that the protrusions in the under surface of pad in accordance with the invention can be designed in such a way that their height can be adjusted, for example in such a way that the protrusions are higher when on a thigh than when the pad is placed on a table. In practice, this can be done, for example, by jointing the protrusion at a suitable place, so that the point of the protrusion can be bent to the side for setting it on a table. There are, indeed, other ways, one being such in which the protrusion telescopes inwards when reasonable force is applied to it and can be re-extended with a suitable pull.

It is clear that embodiments of the invention presented in the figures are by no means intended to limit the possibilities offered by the invention of adapting the basic concept. Thus, the number of the protrusions need not be four, and their shape may be other than that schematically presented in the figure. The form of the pad itself is also a secondary factor, as the shape is largely determined by exterior appearance, as opposed to application of the invention.

We claim:

1. A work pad for supporting an input device of a computer, said work pad comprising:

a flat upper working surface for supporting a computer input device, said flat upper working surface being completely planar up to and including an edge thereof;

a flat bottom surface on a reverse side of said working surface;

protrusion means permanently attached to said bottom surface, for supporting the work pad on a supporting surface, said protrusion means including at least two elongated protrusions with distal ends extending in mutually diverging directions.

2. A work pad as recited in claim 1, said protrusion means comprising four protrusions attached to said bottom surface, said protrusions configured to support the work pad on a thigh of a user.

3. A work pad as recited in claim 2, wherein said four protrusions are configured wherein two protrusions engage the thigh on one side thereof, and two protrusions engage the thigh on another side thereof.

4. A work pad as recited in claim 1, wherein said protrusion means is located at an outer edge of the bottom surface of the work pad.

5. A work pad as recited in claim 1, further comprising a wrist support means adjacent the upper working surface thereof, said wrist support means for comfortably supporting a wrist of the user.

6. A work pad as recited in claim 1, wherein said bottom surface of the work pad, including said protrusion means, is covered with a material which prevents sliding on the support surface.

7. A work pad as recited in claim 5, wherein an outer edge of the work pad in a top view includes side edges and a front edge, defines a curved shape from a first side of the wrist support means to a second side of the wrist support means.

8. A work pad as recited in claim 1, wherein said bottom surface of the work pad, including said protrusion means is covered with a material which minimizes sweat production from skin of a user.

9. A work pad as recited in claim 1, wherein a height of said protrusion means is adjustable.

10. A work pad as recited in claim 9, wherein a position of said protrusion means can be selected, and the protrusion means can be attached with an adhesive.

11. A work pad as recited in claim 1, further comprising attachment means on said protrusion means and said bottom surface, said attachment means for attaching said protrusion means at a selectively adjustable position on the bottom surface.

12. A work pad as recited in claim 11, wherein said attaching means comprises Velcro(™).

13. A work pad as recited in claim 1, wherein an outer edge of the work pad, in a top view, defines an arcuate shape.

14. A work pad for supporting an input device of a computer, said work pad comprising:

a flat upper working surface for supporting a computer input device;

a flat bottom surface on a reverse side of said working surface;

protrusion means permanently attached to said bottom surface, for supporting the work pad on a supporting surface, wherein a position of said protrusion means is selectable by selecting one of a plurality of holes in the bottom surface of the work pad to correspond with at least one pin disposed on the protrusion means.

* * * * *